United States Patent [19]
Laughlin

[11] Patent Number: 5,461,919
[45] Date of Patent: Oct. 31, 1995

[54] LOW-PROFILE MAGNETOHYDRODYNAMIC MOTION SENSOR FOR AN ELECTRONIC SYSTEM

[75] Inventor: Darren R. Laughlin, Albuquerque, N.M.

[73] Assignee: Maxtor Corporation, San Jose, Calif.

[21] Appl. No.: 141,869

[22] Filed: Oct. 22, 1993

[51] Int. Cl.$^6$ .................................................. G01P 15/08
[52] U.S. Cl. .................................... 73/514.03; 310/11
[58] Field of Search .................. 73/516 LM, 517 A, 73/652, 654; 310/11

[56] References Cited

U.S. PATENT DOCUMENTS

| | | | |
|---|---|---|---|
| 3,948,107 | 4/1976 | Asmar | 73/516 LM |
| 4,718,276 | 1/1988 | Laughlin | 73/516 LM |
| 4,780,589 | 10/1988 | Davies | 219/84 |
| 5,067,351 | 11/1991 | Laughlin | 73/516 LM |

*Primary Examiner*—Hezron E. Williams
*Assistant Examiner*—Christine K. Oda
*Attorney, Agent, or Firm*—Emery L. Tracy

[57] ABSTRACT

Angular motion sensor for sensing angular velocity components at higher frequencies. A first lower case member open at the top thereof supports a magnet therein for establishing a magnetic field oriented parallel to a central axis of the lower case. An insulating surface covers the magnet and a conductive liquid is disposed in a channel defined by the insulating surface and the lower case sidewalls. An upper case having an insulated inner surface including a sidewall structure complementary to the lower case sidewall structure forms a lid for the channel and is insulated from the lower case. The upper case is insulated from the conductive liquid, except at a hole in the insulation lying along a central axis of the lower case and upper case. Relative motion between the liquid mass and upper and lower case structures generates a voltage potential between the upper and lower cases, representing the relative velocity.

33 Claims, 3 Drawing Sheets

LOW-PROFILE MAGNETOHYDRODYNAMIC MOTION SENSOR FOR AN ELECTRONIC SYSTEM

RELATED APPLICATIONS

The present application is related to a U.S. patent application, by the same inventor, entitled APPARATUS FOR PROTECTING MEMORY DEVICES FROM EXTERNAL SHOCK FORCES, Ser. No. 08/141,870 co-filed herewith.

BACKGROUND OF THE INVENTION

The present invention is related to the detection of angular motion. Specifically, an magnetohydrodynamic MHD sensor is provided which will sense the presence of angular displacements which result from a shock force being applied to a platform supporting the sensor.

Motion sensors have been developed in the past for sensing low frequency angular displacements. One such sensor is described in previous U.S. Pat. No. 5,067,351, which is especially suitable for measuring low frequency angular displacements. The device described in the foregoing patent is an MHD motion detection sensor with electronic circuitry for providing an amplified sensor output signal representing the angular velocity experienced by the device.

Although the foregoing patented device performs particularly well at low frequency angular measurements, the space requirements for this device are too great for many applications. Further, the device cannot meet the need for greater sensitivity at higher angular motion displacements which is necessary for some applications.

One such application is the detection of shock forces. In certain electronic systems employing magnetic disk drives, it is important to protect the magnetic disk drive against the consequences of an unexpected shock force being applied to the system. The shock force may displace the magnetic head into an adjacent track of a disk at a time it is writing data, resulting in data being written to an inappropriate place on the disk, destroying any data previously written to the affected location.

Experience has demonstrated that to successfully detect the presence of a shock force applied to such systems requires the capability to measure angular displacements which occur in frequencies above several hundred Hertz. Further, such sensing devices must fit within the size constraints imposed by the system being protected.

The present invention overcomes these difficulties to a degree not possible with the device of the foregoing U.S. patent.

SUMMARY OF THE INVENTION

It is an object of this invention to provide for an angular motion sensor for sensing the presence of shock forces.

It is a more specific object of this invention to provide a sensor for detecting a shock induced angular velocity experienced by an electronic system supporting the sensor.

It is still another object of this invention to provide for a motion sensor having a low mechanical packaging profile which is solderable to surface contacts of a printed circuit board. The motion sensor could also be attached to the printed circuit board with conductive epoxy.

It is yet another object of this invention to provide for an angular velocity sensor which is capable of sensing shock force induced displacements in a system including a positioning servo-mechanism system which are beyond the position correction limits of the servo-mechanism.

These and other objects of the invention are provided by an MHD sensor device to detect angular motion displacements in a frequency range which is normally outside the central bandwidth of a servo-mechanism system used for positioning magnetic writing heads. The sensor device is directly solderable to a printed circuit board.

The sensor device is advantageously manufactured from an upper and lower case part which define a cylindrical cavity containing a conductive liquid. The lower case supports a permanent magnet which is insulated from the liquid material. The upper case which closes the channel is insulated over a major portion thereof. A portion of the insulation is removed, along a central axis of the upper case, permitting the upper case to serve as one electrode. The bottom case serves as a second electrode by virtue of its contact with the liquid mass along the edges of the channel.

The sensor may include on either the lower case or upper case, extending tabs which are solderable to a circuit board. The tabs provide mechanical support, as well as electrical contacts with the sensor electrodes. The sensor provides for motion detection about a central axis, supplying a voltage proportional to the angular velocity experienced by the relative movement of the cases with respect to the channel liquid.

DESCRIPTION OF THE PREFERRED EMBODIMENT

Figure 1:
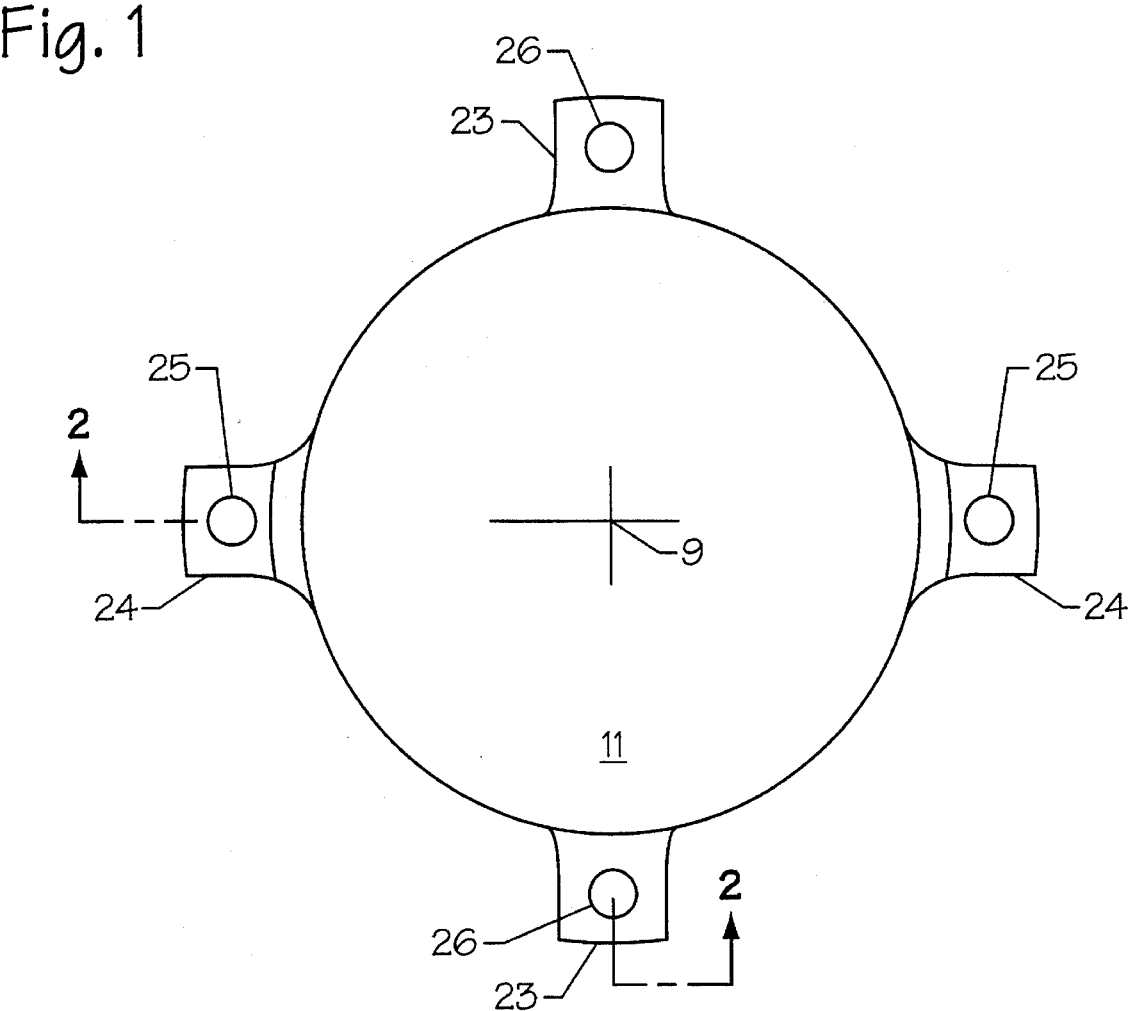
FIG. 1 is a top plan view of one embodiment of a sensor in accordance with the present invention.
Figure 2:
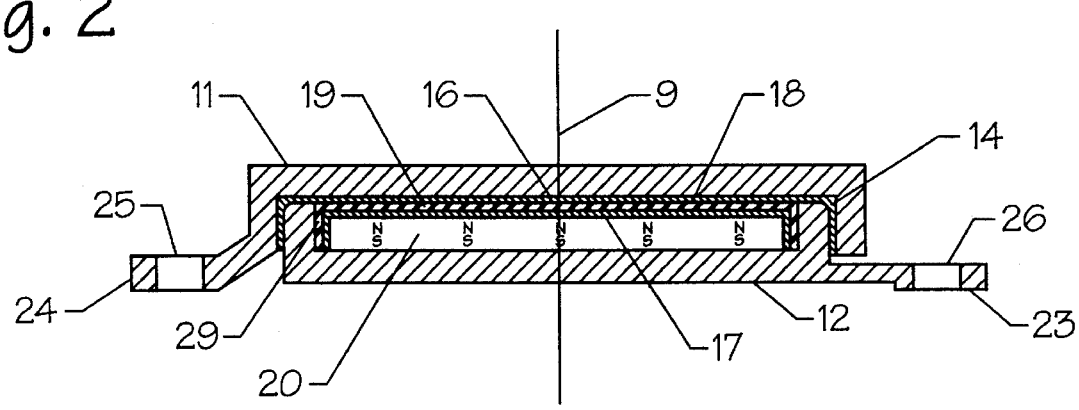
FIG. 2 is a section view of the sensor of FIG. 1.

Referring now to FIGS. 1 and 2, there is shown a top and section view, respectively, of a preferred embodiment of the invention, made from machined parts. In accordance with the present invention, the sensor has a low profile, and in accordance with a preferred embodiment, includes a plurality of tabs 23, 24 which support the sensor to a circuit board. Each of the tabs are nickel plated to approximately a 50–100 microinch thickness, and then tin/lead plated to enhance solderability to circuit board connections. Holes 25 are located in each of the tabs which aid in solder flow and permit a more secure bonding to complementary plated surfaces on the circuit board.

The tabs also serve as electrode connections for the motion sensor. As shown in FIG. 2, the tabs are connected to the exterior sidewall surface of the upper case 11 or lower case 12 of the sensor. The cases 11 and 12 are of a magnetic material which may be stainless steel. The upper case 11 and lower case 12 are machined to the configuration shown.

The two cases are insulated from each other by virtue of an insulation material 18, which coats the bottom of upper case 11. The cases are bonded together with an epoxy 14 located along the side walls of the upper case 11 and lower case 12.

Each of the cases are cylindrical and include a bottom and sidewall structure, open to be received by a complementary sidewall structure of the other case. The lower case defines an interior space which includes a permanent magnet 20 having a north/south orientation, parallel to an axis 9 of the two cylindrical cases 11 and 12. The bottom of the upper case 11 forms a lid for the lower case.

The magnet 20 is covered by an insulation material 17, insulating the top and side surfaces of the magnet from the conductive fluid 19. The space bounded by the insulation 17 and 18 defines a liquid channel which contains a conductive liquid 19 such as a gallium-indium-eutectic. However, other conductive fluid such as mercury, gallium-indium alloys (including Ga-In-Sn-Zn eutectics), or conductive liquid polymers, or any other electrically-conductive fluid, could also be used. The liquid eutectic contacts the sidewalls of the lower case 12 which forms one electrode of the sensor. Located along the axis 9 is a small hole 16 in the insulation 18 of the upper case 11, permitting the upper case to contact the gallium-indium-eutectic 19 along the axis 9, and serve as the second electrode for the device.

It has been found that coating the bottom of the upper case 11 with a nickel or tin plating, which is exposed to the hole 16 in the insulation 18, insures good electrical contact with the gallium-indium-eutectic 19.

The principle of operation for the sensor device of FIG. 2 is similar to that of the earlier-referenced patent in that relative motion between the gallium-indium-eutectic 19 and the upper case 11 and lower case 12, induces a voltage potential and corresponding voltge between the center and circumferential areas of the gallium-indium-eutectic 19, which are in contact with the upper case 11 and lower case 12. The electrical potential may be sensed between the tabs 23 and 24 on the upper and lower cases 11 and 12.

The manufacture of the device of FIGS. 1 and 2 requires that the liquid gallium-indium-eutectic 19 be inserted in the channel 29 and filled within the space defined by the sidewall of the lower case 12. Once this space is filled, the upper case is pressed over the sidewall of the lower case until the insulated bottom of the upper case is in contact with the sidewall of the lower case 20, forming a lid for the liquid channel 29. Any excess gallium-indium-eutectic is expelled via the sidewalls and is removed in the sidewall space between the upper, lower cases. An epoxy applied to the inner sidewall of the upper case 11 prior to receiving the sidewall of lower case 12, will assure a seal between the upper case 11 and lower case 12. The gallium-indium-eutectic 19 will experience positive pressure, forcing the eutectic in contact with the exposed surface 16 of the upper case 11.

Figure 3A:
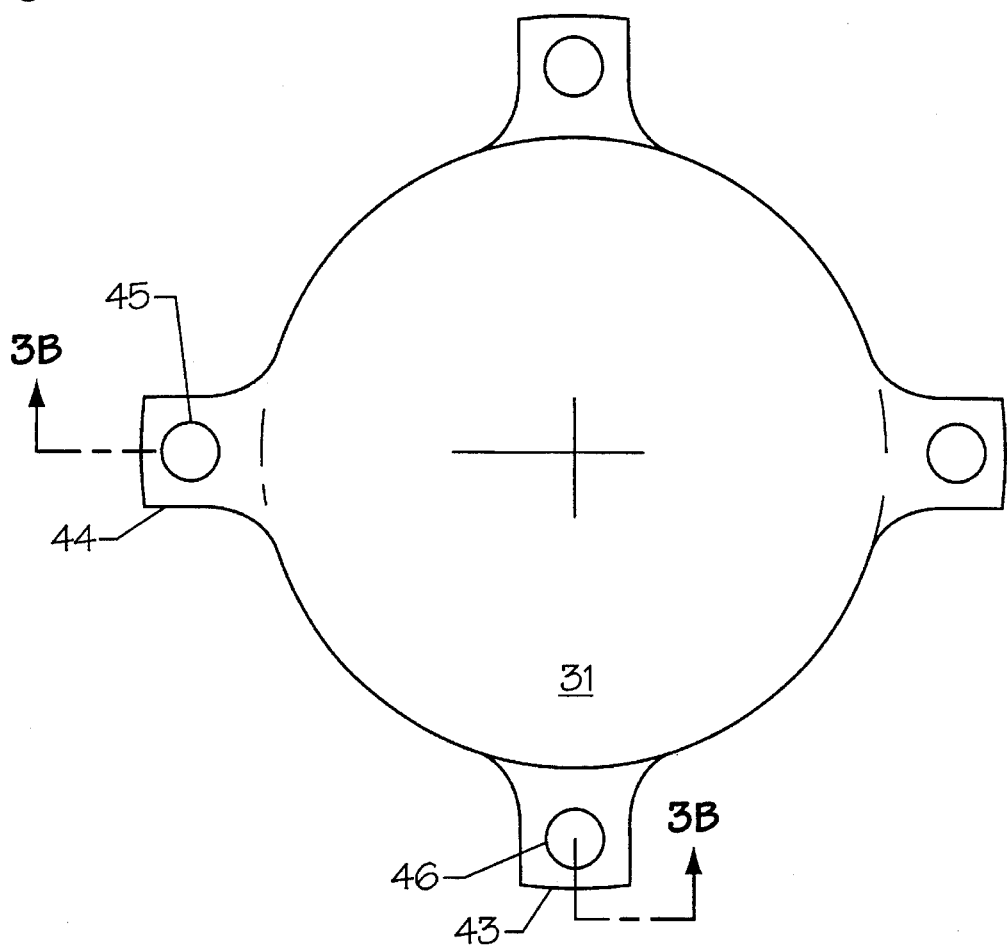
FIG. 3A illustrates a section view of a stamped version of the sensor in accordance with the present invention, which includes a spacer element.

FIG. 3A is a section view of a second embodiment of the invention, wherein the upper case 31 and lower case 32 are made as stamped parts. The bottom of the upper case 31 is coated with a high temperature electrical insulator 38, as well as the interior surface of the sidewall. A small opening 36 is formed in the insulator 38 to permit electrical contact with the metal case 31. As in the previous embodiment, the upper and lower case materials may be a magnetic stainless steel.

An optional magnetic spacer disk 48 may be located in the bottom of case 32, to effectively increase the thickness of the lower case 32 and decrease the magnetic reluctance between the bottom of magnet 40 and the thinner stamped lower case 32 and the upper case 31. In this way, the same amount of magnetic flux may be transferred through the structure defined by the lower case, upper case and channel containing the gallium-indium-eutectic 39, as in the previous embodiment of FIGS. 1 and 2.

Advantages of manufacture are obtained because the bonding between the upper case 31 and lower case 32 occurs by virtue of the conformance between the sidewall 33 and sidewall 49 of the lower case 32. The sidewall 49 is formed in a double thickness, by bending the material along an arc 47 greater than 180°. When the channel defined between a polyimide insulating disk 37 and the interior surface of the sidewall of lower case 32 is filled with the gallium-indium-eutectic 39, the upper case 31 is forced over the double thickness sidewall 49 of the lower case 32. The pressure applied to the upper case 31 forces the exterior sidewall 49 inward. The wall structure 33 of the upper case 31 applies compressive forces against the exterior sidewall 49 of lower case 32. This results in a crimping effect between the sidewall 33 of the upper case 31, and the exterior sidewall 49 of the lower case 32.

As in the previous embodiment, electrodes are formed by the contact between the interior sidewall of lower case 32 and the gallium-indium-eutectic circumference 39. A second electrode is formed by virtue of contact between the gallium-indium-eutectic at the sensor axis 9 through a hole 36 in the insulator 38. Connections are made to the sensor through the tabs 43 and 44 (having holes 46 and 45, respectively) as in the previous embodiment.

Figure 3B:
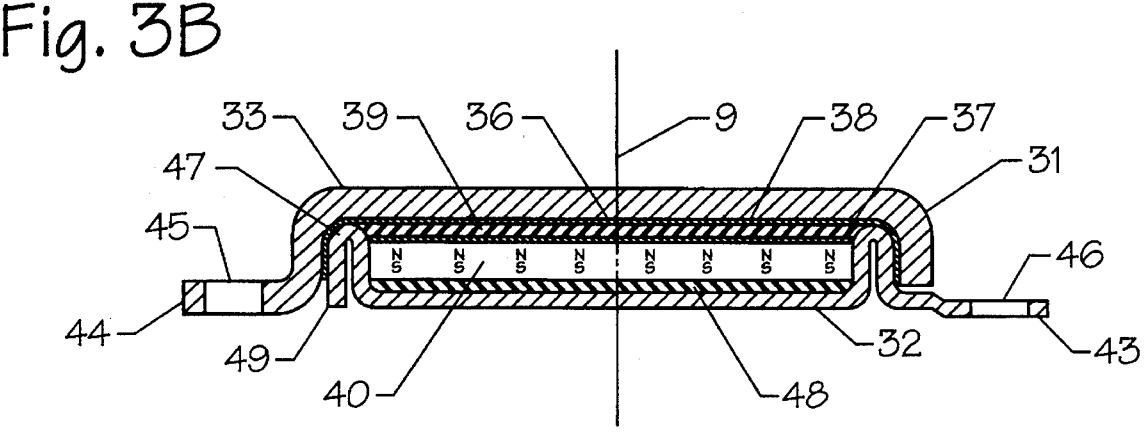
FIG. 3B illustrates a top view of the device of FIG. 3A.

The embodiment of FIGS. 3A and 3B provides for a sensor having a height smaller than 1.7 mm. and an outside diameter of less than 12 mm.

In each of the foregoing cases, the magnets 20 and 40 have a magnetic energy product of approximately 39 mega oersted.

The construction of the foregoing sensors produces an advantageous package configuration of a low profile and small surface area. The device has a transfer function in the frequency domain of $$\frac{V(s)}{\theta(s)} = \left| \frac{B_o r w S}{S + \frac{1}{\tau}} \right|$$

where:

$$\frac{1}{\tau} = \frac{v}{h^2} [1 + M^2];$$

$$M = \frac{B_o h}{\sqrt{\eta \rho v}} \text{ (Hartmann Number)}$$

V(s)=Shock sensor voltage output [V]
θ(s)=Angular Rate Input [rad/s]
v=Kinematic Viscosity of GaIn Eutectic [5E-6 m$^2$/s]
η=Resistivity of GaIn [3.3E-7 Ω-m]
ρ=Density of GaIn [6.5E3 Kg/m$^3$]
B$_0$=GaIn Channel Magnetic Flux Density [0.32T Tesla]
w=GaIn Channel Effective Width [0.0027m]
r=GaIn Channel Root Mean Square Radius [0.0023m]
h=GaIn Channel Effective Height [1.5 E-4m]
S=Laplace Variable [S=j2πf]
τ=Sensor Time Constant[s]

Figure 4:
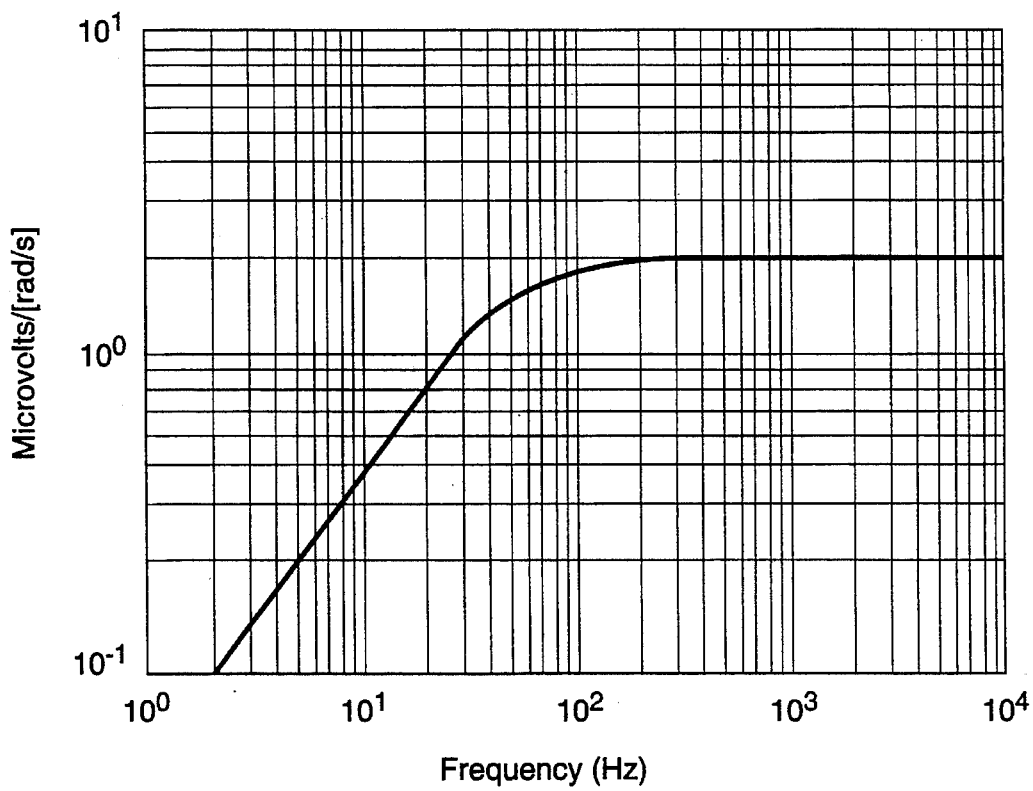
FIG. 4 shows the frequency response of the sensors according to the preferred embodiment.
Figure 5:
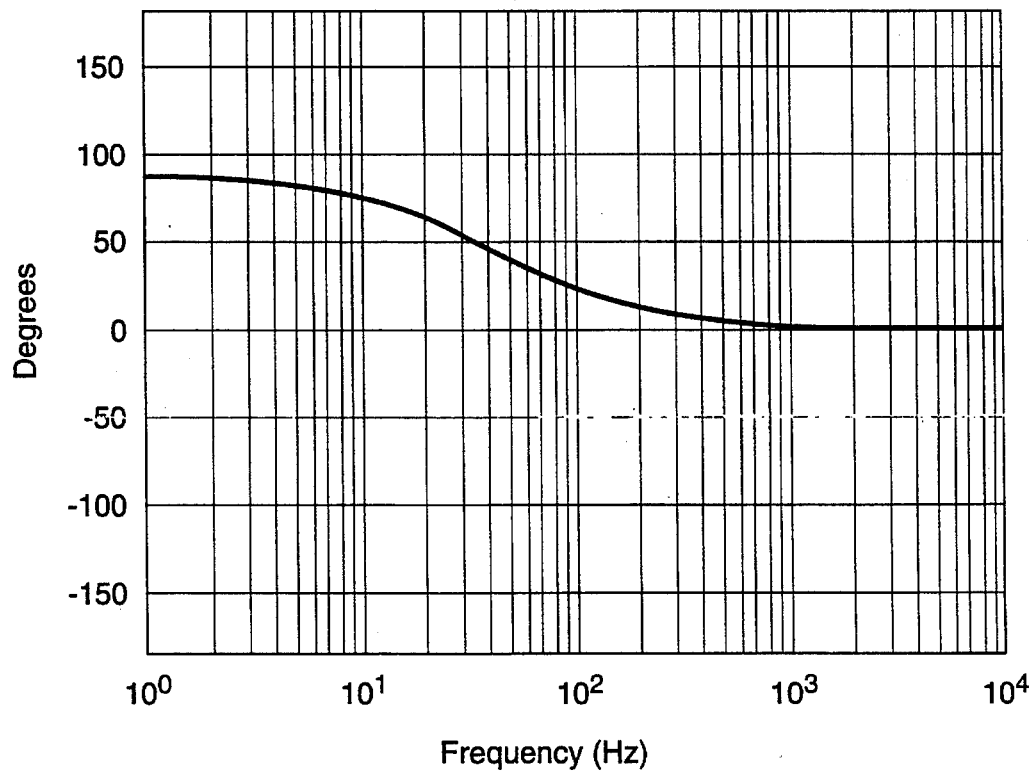
FIG. 5 shows the phase response of the sensor in accordance with the preferred embodiment.

The performance of the device in detecting angular motion is demonstrated by FIGS. 4 and 5.

FIGS. 4 and 5 illustrate the angular velocity amplitude (magnitude) response function (FIG. 4) and angular velocity phase function (FIG. 5). FIG. 4 demonstrates that above 100 Hz. the sensor response is exceedingly flat, providing the capability of detecting the angular velocity component between 100 Hz. and 10,000 Hz.

The phase response in this area of interest is also considered linear, which in some applications, such as shock sensing, will permit an accurate measurement of the angular velocity imparted to the surface supporting the sensor, and the angular displacement of the surface in response to a shock force.

The voltage representing the angular velocity imparted to the sensor may be amplified and integrated to provide the angular displacement. As displacement in shock sensing applications may be the more important consequence to monitor, circuitry as described in the foregoing co-pending application may be implemented to detect excessive displacements which may cause damage. In the case of systems which employ magnetic disk drives having magnetic heads which write information to a track on a rotating magnetic surface, displacements from a shock force may be accurately detected and used to inhibit further writing to the disk, preventing the destruction of data on an adjacent track.

Thus, there is described a sensor device for detecting higher angular velocity frequency components than were previously attained using the previously patented device, while observing the practical space constraints imposed by the devices which are to be protected from shock forces. Those skilled in the art will recognize yet other embodiments of the invention described more particularly by the claims which follow.

What is claimed is:

1. A low-profile motion sensor supported on a printed circuit board (PCB), the sensor comprising:

a magnet covered by an insulating layer;

a lower case member having an opening bounded by a lower case sidewall, the opening having a dimension sufficient to surround the magnet, and the magnet establishing a magnetic field oriented aligned with a central axis of the lower case member;

an upper case member having an insulative surface, the upper case member having a width which is larger than the dimension of the opening such that when the upper and lower case members are conformably engaged, a space is formed bounded by the insulative surface of the upper case member, the lower case member sidewall, and the insulating layer covering the magnet;

a conductive liquid disposed within the space, the lower case sidewall providing a first electrode and the upper case member providing a second electrode through a hole in the insulative surface, both the first and second electrodes contacting the conductive liquid; and wherein a relative angular movement of the upper and lower case members with respect to the conductive liquid in the presence of the magnetic field causes a voltage to be generated between the first and second electrodes.

2. The sensor of claim 1 wherein the voltage is proportional to the angular velocity experienced by the relative angular movement.

3. The sensor of claim 2 wherein the upper case member comprises a cap having an inner sidewall which is fixedly secured to the lower case member.

4. The sensor of claim 3 wherein the lower case sidewall has a cylindrical inner surface such that the space comprises a cylindrical cavity.

5. The sensor of claim 4 wherein the magnet comprises a cylindrical disk having a side, and upper and lower planar surfaces, at least the side and the upper surface being covered by the insulating layer.

6. The sensor of claim 5 wherein the lower surface of the magnet is bonded to the lower case member within the opening and the magnetic field is oriented perpendicular to the upper and lower planar surfaces of the magnet.

7. The sensor of claim 1 wherein at least one of the upper and lower case members further comprises a means for mounting the motion sensor to the PCB.

8. The sensor of claim 7 wherein the mounting means comprises a plurality of tabs configured to attachment to the PCB.

9. The sensor of claim 2 wherein the first electrode comprises a metallic portion of the lower case sidewall.

10. The sensor of claim 9 wherein the second electrode comprises a metallic surface of the upper case member.

11. The sensor of claim 10 wherein the metallic surface comprises nickel.

12. The sensor of claim 10 wherein the metallic surface comprises tin.

13. The sensor of claim 10 wherein the upper and lower case members comprise stainless steel.

14. The sensor of claim 4 further comprising a spacer element attached to the lower planar surface of the magnet, the spacer element reducing the magnetic reluctance between the magnet and the lower case member.

15. The sensor of claim 5 wherein the insulating layer comprises a polyimide.

16. The sensor of claims 1, 2, 3, 4, 5, 6, 7, 8, 9, 10, 11, 12, 13, 14 or 15 wherein the conductive liquid comprises a polymer.

17. The sensor of claims 1, 2, 3, 4, 5, 6, 7, 8, 9, 10, 11, 12, 13, 14 or 15 wherein the conductive liquid comprises a gallium-indium eutectic.

18. The sensor of claim 17 wherein the conductive liquid is a gallium-indium-tin-zinc eutectic.

19. The sensor of claim 17 wherein the sensor has a height smaller than 1.7 millimeters.

20. In a servo-mechanism system, a low-profile hydrodynamic (MHD) sensor supported on a printed circuit board (PCB) for detecting an angular motion displacement which exceeds a central frequency range of the servo-mechanism system, the sensor comprising:

a magnet covered by an insulator;

a lower case having a central axis and a sidewall structure which forms an opening, the opening having a flat bottom surface and a dimension which is sufficient to surround the magnet, the magnet being disposed within the opening to establish a magnetic field oriented aligned with the central axis;

an upper case having an insulated surface, the upper case having a width which is larger than the dimension of the opening such that when the upper case is conformably secured to the lower case the magnet is enclosed within the opening, a space being defined by the boundaries of the insulated surface of the upper case, the sidewall structure of the lower case, and the insulator covering the magnet;

an electrically conductive fluid filling the space;

wherein the insulated surface of the upper case includes a hole aligned with the central axis of the lower case, the upper case further including a first electrode which contacts the fluid through the hole, the sidewall structure of the lower case providing a second electrode which contacts the fluid, and wherein a voltage is generated across the first and second electrodes in response to a relative movement of the upper and lower cases with respect to the fluid in the space, the voltage being proportional to the angular velocity of the relative movement.

21. The sensor of claim 20 wherein the magnet comprises upper and lower planar surfaces and a side surface, at least the upper and side surfaces of the magnet being covered by the insulator.

22. The sensor of claim 21 wherein the upper and lower cases each are cylindrical.

23. The sensor of claim 22 wherein the space comprises a cylindrical cavity and an annular channel.

24. The sensor of claim 23 wherein the lower planar surface of the magnet is attached to the flat bottom surface of the opening.

25. The sensor of claim 20 further comprising a spacer means separating the lower planar surface of the magnet from the flat bottom surface of the opening for decreasing the magnetic reluctance between the magnet and the lower case.

26. The sensor of claim 23 wherein the upper case comprises a cap, a peripheral portion of the cap being conformably secured to the lower case.

27. The sensor of claim 26 wherein the cap further comprises means for mounting the sensor to the PCB.

28. The sensor of claim 26 wherein the case further comprises a means for mounting the sensor to the PCB.

29. The sensor of either claims 27 or 28 wherein the fluid comprises a gallium-indium eutectic.

30. The sensor of either claims 27 or 28 wherein the fluid comprises a liquid polymer.

31. The sensor of claim 29 wherein the fluid is a gallium-indium-tin-zinc eutectic.

32. The sensor of claim 31 wherein the means for mounting comprises a plurality of tabs.

33. The sensor of claim 32 wherein the insulator comprises a polyimide.

* * * * *